United States Patent [19]

Heath

[11] Patent Number: 4,738,274

[45] Date of Patent: Apr. 19, 1988

[54] CAP FOR COVERING AN OPEN STRUCTURE

[76] Inventor: William D. Heath, Box 99, Rte. 23, Davenport, N.Y. 13750

[21] Appl. No.: 883,650

[22] Filed: Jul. 9, 1986

[51] Int. Cl.⁴ .................... E04H 15/06; E04H 15/44; B60P 7/02; B60P 1/00
[52] U.S. Cl. .................................. 135/88; 135/106; 296/100; 296/156
[58] Field of Search .................. 135/88, 90, 101, 106, 135/115, DIG. 9; 296/100, 156, 102, 105, 159

[56] References Cited

U.S. PATENT DOCUMENTS

| | | | |
|---|---|---|---|
| 1,765,639 | 6/1930 | Tucker | 296/102 |
| 2,783,082 | 2/1957 | Genua | 135/88 X |
| 2,936,771 | 5/1960 | Marchfield et al. | 135/106 |
| 3,095,069 | 6/1963 | Winkler | 135/106 |
| 3,095,231 | 6/1963 | Reed | 135/88 X |
| 3,201,171 | 8/1965 | Wickard | 296/100 |
| 3,649,063 | 3/1972 | Stark | 296/159 |
| 3,901,548 | 8/1975 | Seaman, Jr. | 135/88 X |
| 4,215,894 | 8/1980 | Sidlinger | 135/88 X |
| 4,300,253 | 11/1981 | Anderson | 135/106 X |
| 4,347,690 | 9/1982 | Wallace, Jr. | 135/101 X |

FOREIGN PATENT DOCUMENTS

| | | | |
|---|---|---|---|
| 104847 | 9/1938 | Australia | 135/DIG. 9 X |
| 309325 | 4/1929 | United Kingdom | 135/106 |

Primary Examiner—Robert A. Hafer
Assistant Examiner—D. Neal Muir

[57] ABSTRACT

A cap for covering an open structure such as the box of a pick-up truck, said cap, including a fabric cover and a readily assembled and disassembled tubular frame with telescopic members including struts with clips on each end, the cover being stretched over the frame and including a flap at one end to permit ingress and egress into the cap.

17 Claims, 2 Drawing Sheets

CAP FOR COVERING AN OPEN STRUCTURE

BACKGROUND OF THE INVENTION

The use of caps, particularly on pick-up trucks, has become very popular. A cap on a pick-up truck permits use of the cargo space during inclement weather and is generally a desirable and useful addition. Such caps, which are usually fabricated into a single unit from plastic and metal, are expensive to purchase, heavy in weight causing difficulty in installation and, when not in use require substantial storage space. Notwithstanding the desirability of a cap, under certain circumstances, such as a load having a large volume, it becomes necessary to remove the cap. A cap of the single unit design creates a problem of both removal and storage. In addition a single-unit cap is expensive to produce and to ship resulting in a comparatively high cost.

In accordance with this invention, a cap is provided for use on a pick-up truck or similar type of open structure that can be purchased at a comparatively low cost in a kit form packaged in a box that is readily shipable at low cost and can be carried by an individual under his or her arm and, in addition thereto, can be installed in a very short time and repackaged back into its original container or a similarly small container in a similarly short time.

SUMMARY OF THE INVENTION

In accordance with this invention, a cap for use on a pick-up truck or similar open structure is provided in the form of a readily assembled tubular frame formed from telescopic tubular members including struts with U-shaped clips for securing the struts in place and with a fabric cover which extends over the frame. A door frame is located at one end of the cap and a flap is located in the fabric cover at the location of the door frame. The tubular frame is mounted upon support members which are readily secured to the structure frame being covered.

DETAILED DESCRIPTION OF THE DRAWING

DETAILED DESCRIPTION OF THE INVENTION

Figure 2:
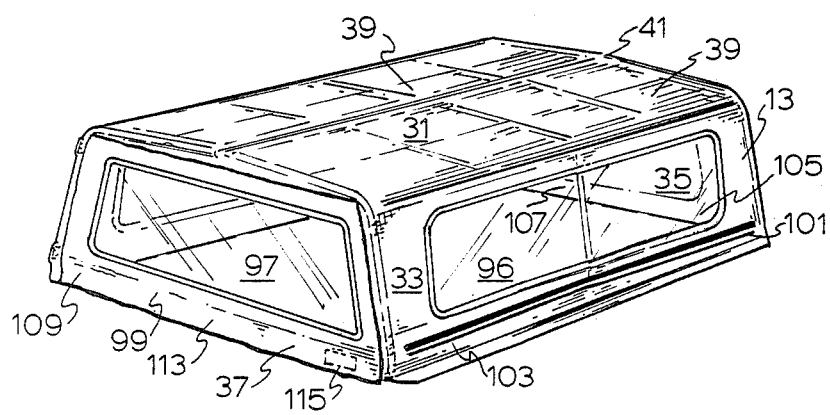
FIG. 2 is a perspective view of just the cap as fully assembled but removed from the pick-up truck.
Figure 3:
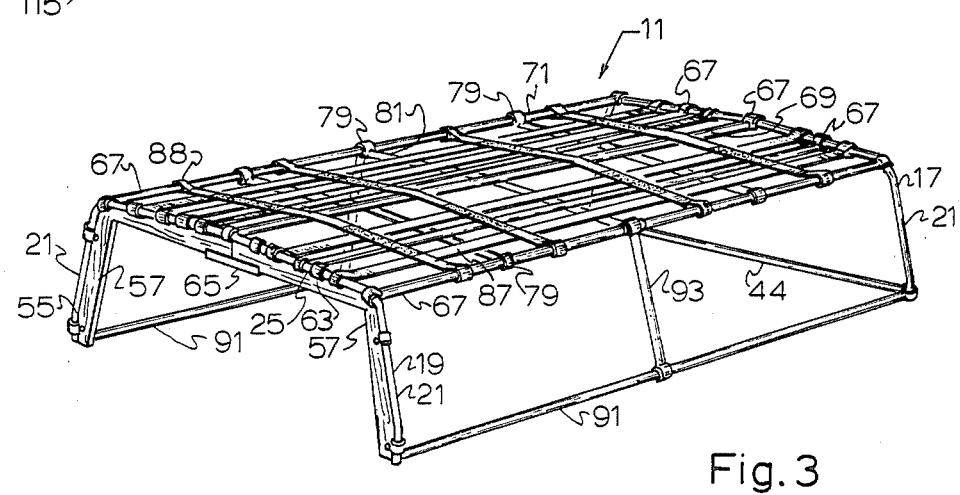
FIG. 3 is a perspective view of the assembled frame portion of the cap with the covering removed and without the bed supports.
Figure 4:
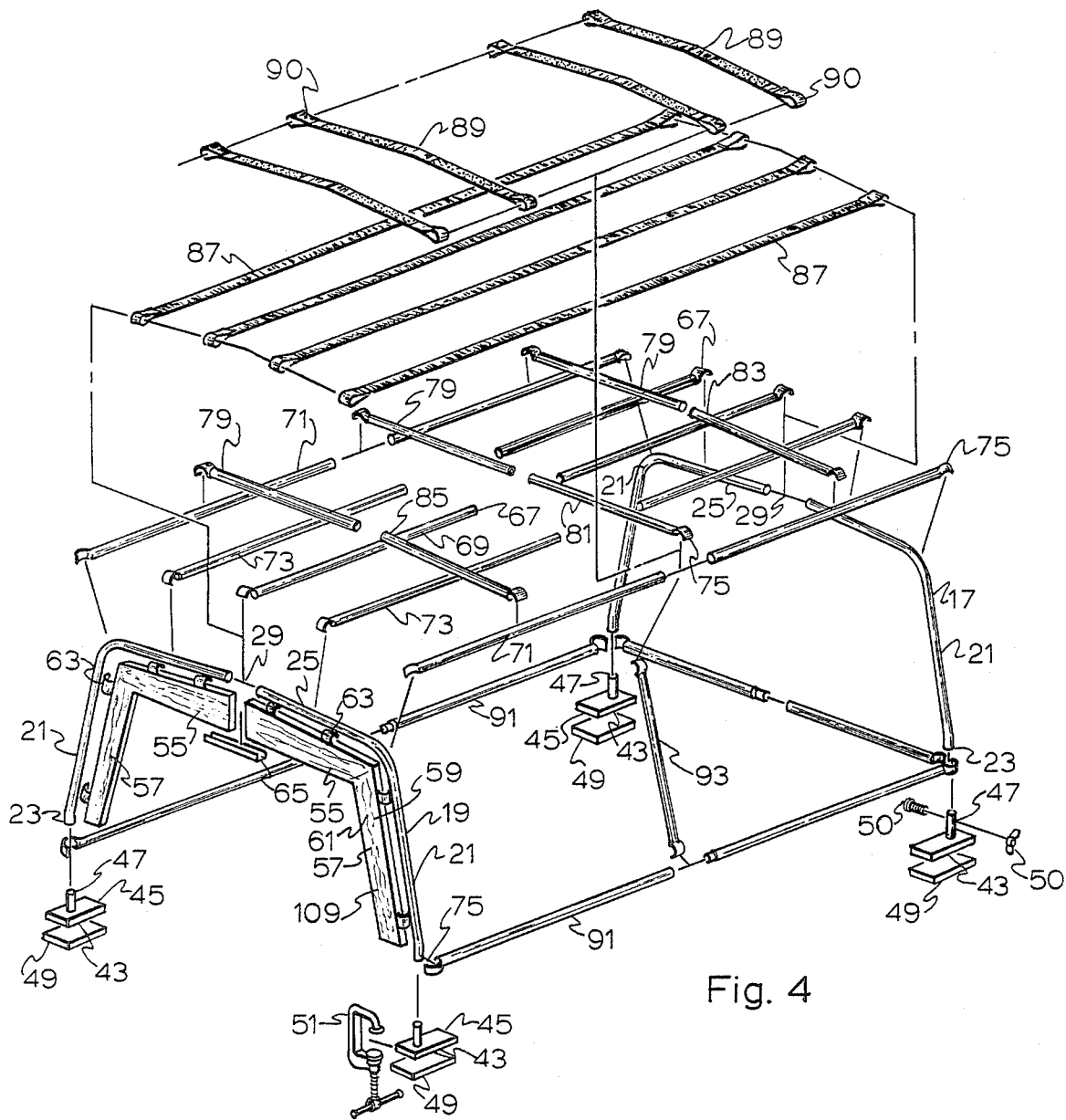
FIG. 4 is an exploded view of the frame showing each of the individual parts including the bed supports.
Figure 5:
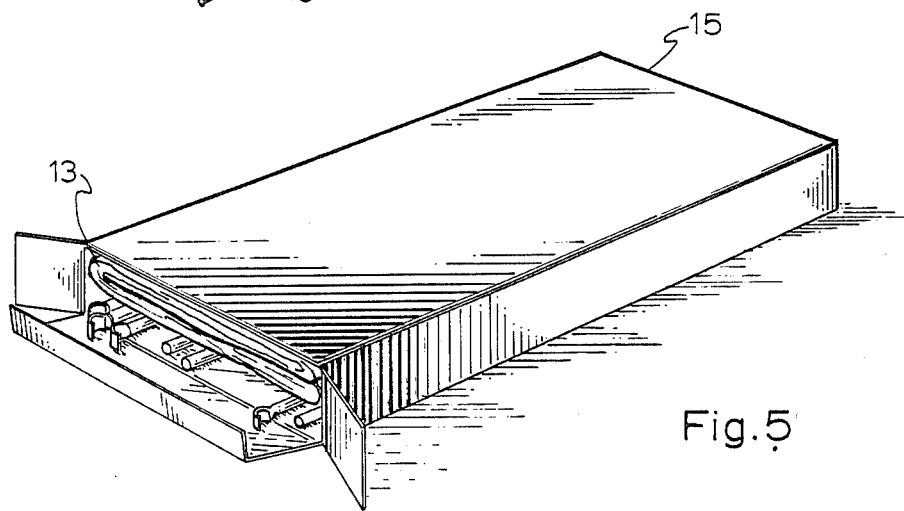
FIG. 5 is a perspective view of the container in which the disassembled cap is sold, moved and stored with one end of the container open showing a small portion of the cover and tubular parts of the cap.

The truck cap in accordance with this invention, has two major portions, namely a frame 11 as shown in FIG. 3 and a cover 13 of fabric or vinyl which fits over the frame 11 as shown in FIG. 2. As best seen in FIG. 4, the frame 11 comes in various parts which can be disassembled and stored along with the cover 13 in a container 15 as best seen in FIG. 5. Since the cap can be readily assembled and disassembled, it is preferably sold, transported and stored in kit form.

Figure 1:
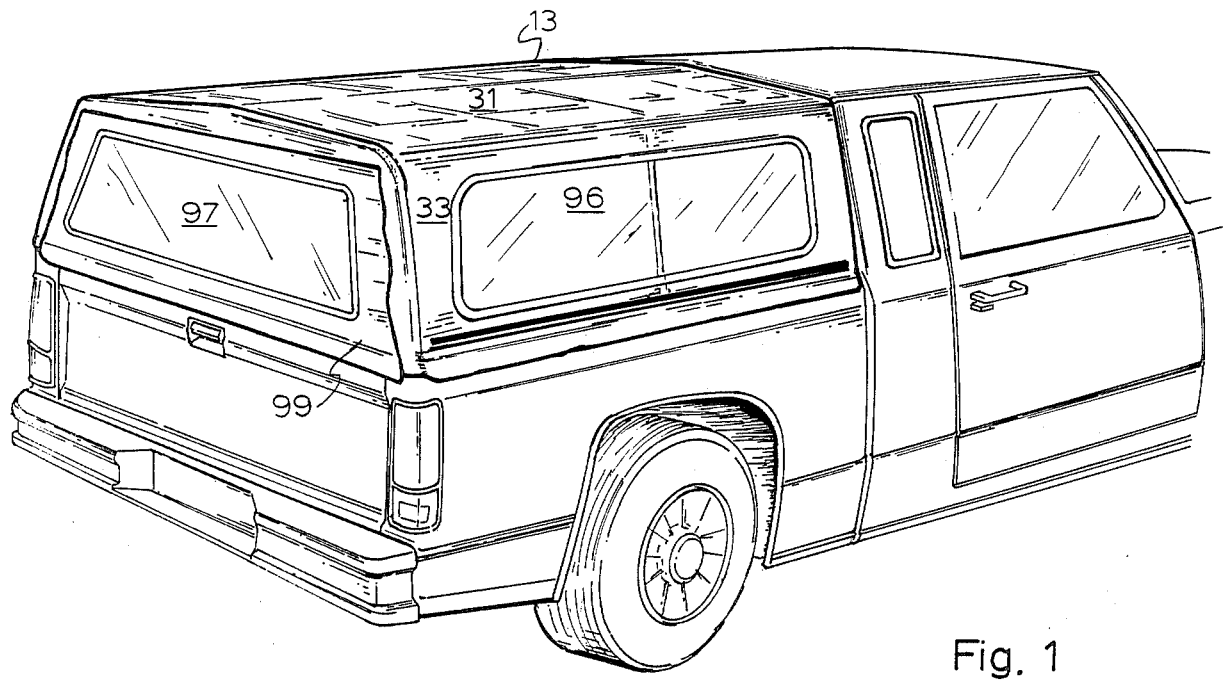
FIG. 1 is a perspective view of the cab and rear portion of a pick-up truck showing the cap mounted on the box of the pick-up truck in accordance with this invention.

Referring specifically to FIGS. 3 and 4, at one end of the frame 11 there is located a front bow 17 and at the opposite or rear end, there is located a rear bow 19. Both the front bow 17 and the rear bow 19 are formed in two substantially symmetrical halves 21 which telescopically engage one another. Both the front bow 17 and the rear bow 19 are formed from tubing which is hollow and when each is assembled it has the general shape of an inverted U, with two open ends 23. Both the front bow 17 and the rear bow 19 include an upper section 25 and two side sections 27. The upper section 25 slopes downwardly and outwardly from a center point 29 at a small acute angle to the horizontal, while the two side sections 27 slope outwardly and downwardly at a small acute angle to the vertical. In this way, the cap as best seen in FIGS. 1 and 2, is provided with a roof area 31, two side areas 33, a front area 35 and a rear area 37. The roof area 31 includes two roof sections 39 which slope downwardly away from a centerline 41.

Referring to FIG. 4, four support members 43 are provided, each including a flat rectangular plate 45 with a post 47 extending substantially at right angles from one side of the flat plate 45. A cushion 49, preferably a foam material, is affixed to the four support members 43 on the face of the flat rectangular plate 45 opposite from the face where the post 47 is located. The function of the cushion 49 is to avoid scratching the pick-up truck or other structure upon which the cap is to be mounted. The four support members 43 are affixed to the structure in each of four corners by means of any suitable clamping or fastening means but in order to provide maximum flexibility and easy removal, C-clamps 51 of the standard known variety are preferably used to assure that the four support members 43 can be readily removed and yet held sturdily in place as long as may be desired.

The two open ends 23 of the front bow 17 are placed over the posts of two of the four support members 43 located at the forward part of the structure or truck box and the open ends 23 of the rear bow 19 are placed over the posts 47 of the two remaining support members 43 located at part of the structure. A bolt and wing nut 50 secures the front bow 17 and the rear bow 19 to the posts 47.

A rear door frame 55 fits within the rear bow 19. The rear door frame 55 has a rectangular cross-section and is made in two generally symmetrical sections 57 with an outer edge 59 and an inner edge 61. The outer edge 59 has a series of rigid loops 63 which are connected at only one end to the rear door frame 55. The rigid loops 63 are clipped around the rear bow 19 and in that way the rear door frame 55 is secured within the rear bow 19. A channel 65 with a generally U-shaped cross-section, being an elongated member with a U-shape, is clipped along the inner-edge 61 of the rear door frame 55 where the two half sections of the rear door frame 55 meet thereby securing the two symetrical sections 57 of the rear door frame 55 together.

In the roof area 31 of the cap, a plurality of upper struts 67 are provided including one which is a center upper strut 69 as well as two outside upper struts 71. For added strength, two intermediate upper struts 73 between the center strut 69 and each of the outside struts 71 are recommended. The center upper strut 69 extends from the center of the front bow 17 to the rear bow 19. All of the upper struts 67 are formed of a tubular material and in two sections which telescopically engage each other. The two sections of the upper support struts 67 are telescopically engaged and each of the upper support struts include a U-shaped clip 75 rigidly affixed to both outside ends. The U-shaped clip 75 on each end of the upper struts 67 is so adapted in size that it can be pressed over the tubular members which form the front bow 17 and the rear bow 19 and will then remain firmly in place by its own resilient force, but can, with reasonable strength, be pulled off the front bow 17 and the rear bow 19 for disassembly purposes.

The center upper strut 69 extends from the center point 29 of the front bow 17 to the center point 29 of the rear bow 19. The two outside upper struts 71 also extend from the front bow 17 to the rear bow 19, but the two outside upper struts 71 are located along the upper section 25 of the front bow 17 and the rear bow 19. Each intermediate upper strut 73 is placed between the center upper strut 69 and one of the two outside upper struts 71. Each of the upper struts 67 are substantially parallel to one another with the outside upper support struts 71 each being located on opposite sides of the front bow 17 and the rear bow 19 adjacent to the side sections 27.

One or more bowed roof struts 79 gives additional support to the roof area 31 of the cap. Preferably, a center bowed roof strut 81 is located centrally between the front bow 17 and the rear bow 19 and a rear bowed roof strut 83 is located substantially midway between the center bowed roof strut 81 and the rear bow 19. A front bowed roof strut 85 is located midway between the center of the center bowed roof strut 81 and the front bow 17. Each bowed roof strut 79 is also formed from tubular material and in two sections which telescope together. Each assembled, bowed roof strut 79 includes two flexible U-shaped clips 75 at each end similar to the U-shaped clips 75 previously described for the upper struts 67. Each bowed roof strut 79 has a shape similar to that of the upper section 25 of both the front bow 17 and the rear bow 19 and is fastened by means of U-shaped clips 75 to the two outside upper struts 71.

Longitudinal webbing including four longitudinal webs 87 and cross webbing including four cross webs 89 are used to give further support to the areas to those parts of the roof area 31 of the cap along with the five upper struts 67 and the bowed roof struts 79 and the front bow 17 and the rear bow 19. As is best seen in FIGS. 3 and 4, four longitudinal webs 87 of a fabric material, each having a loop 88 at each end extend from the upper section or portion 25 of the front bow 17 to the upper section or portion 25 of the rear bow 19. Each of the four longitudinal webs 87 are stretched reasonably taut so as to provide support to the cover 13 when in place over the frame 11. Two of the four longitudinal webs 87 are located between one outside upper strut 71 and the center upper strut 69 while the other two of the four longitudinal webs 91 are located generally symmetrically between the other outside upper strut 71 and the center strut 69. All four longitudinal webs 87 are located over the bowed roof struts 79.

The four cross webs 89 are preferably located over the longitudinal webs 87 and are formed in a similar manner from flexible fabric webbing material with a loop 90 at each end but with a length so as to be reasonably taut when opposite loops 90 are placed around opposite upper struts 67. When stretched between the two outside upper struts 71 two of the four cross webs 89 are located between the front bow 17 and the center bowed roof strut 81 and the remaining two of the four crosswebs 89 are located between the rear bow 19 and the center bowed roof strut 81.

The loops 88, 90 at the ends of both the cross webs 89 and the longitudinal webs 87 may be stitched but for easy installation reusable adhesive material affixed to the straps may be used so as to permit forming the loops 88, 90 when installed.

Two lower struts 91 extend between the front bow 17 and the rear bow 19 but just adjacent the support members 43. Each of the two lower or side struts 91, which are substantially parallel to one another and are connected to the front bow 17 and the rear bow 19 but on opposite sides of the cap, are also formed from tubing in two telescoping sections slidably engaged with one and other. The assembled lower struts 91 have U-shaped clips 75 at each outside end and similar to the U-shaped clips 75 previously described. The U-shaped clips 75 on the lower struts are clipped to the front bow 17 and the rear bow 19 at their lower ends which are mounted over the posts 47 on the support member 43 as previously described.

A vertical strut or support 93 is located on each side of the frame 11 extending between the lower struts 91 and the outside upper struts 71 approximately midway between the front bow 17 and the rear bow 19. Each vertical strut 93 is formed in a unitary piece with a U-shaped clip 75 at each end.

A front cross strut 94 is provided which extends between the lower ends of the front bow 17 and affixes to the front bow 17 substantially at the same location as do the lower struts 91. A rear cross strut 95 is also provided which extends between the lower ends of the rear bow 19 and affixes to the rear bow 19 substantially at the same location as do the lower struts 91. The front cross strut 94 is also formed from tubing in two sections which telescopically engage one another with a U-shaped clips 75 similar to those previously described, affixed to both ends. The U-shaped clips 75 on the front cross-strut 94 are designed larger, so as to fit over the U-shaped clips 75 of the two lower struts 91 which also engage both the front bow 17 and the rear bow 19.

The cap, as has been stated, and thus the cover 13 which fits over the frame 11 includes the roof area 31, the two side areas 33, the front area 35 and the rear area 37. The two side areas 33 include windows 96 as shown in FIGS. 1 and 2. The front area 35 and the rear area 37 of the cover 13 which substantially have the same shape as the rear bow 19 and the front bow 17. However, the front area 35 of the cover 13 is formed in one piece with the roof area 31 and the two side areas 33 while the rear area 37, which preferable also includes a rear window 97, is only connected with the roof area 31 with no break being located between the rear area 37 and the two side areas 33, permitting the rear area 37 to include a flap 99 that can be lifted for ingress and egress into the enclosure created by the cap. The front area 35, preferably, also has a window (not shown) to permit use of a rear view mirror (not shown).

Both side areas 27 of the cover 13 include lower longitudinal sections 101, each with an elongated hem 103 at the base and in each of the elongated hems 103 one of the lower struts 91 is located, which pulls taut the cover 13 between the two lower struts 91 thereby forming a tightly fitting roof area 31 and two side areas 33.

The front area 35 of the cover 13 has a front lower section 105 with a lower hem 107 running completely along the front lower section 105 and the front cross strut 94 is located in the lower hem 107 of the front lower section 105, thereby pulling the front area 35 taut about the front bow 17. Around the outside of the rear door frame 55 adhesive material 109 is placed. The adhesive material 109 is the type which will repeatedly adhere to can be pulled opened and resecured repeatedly. Such adhesive material 109 is commercially available and is included in the kit 15 by which the cap is sold. One part of the adhesive material 109 is secured on one side to the outer edge 59 of the rear door frame 55 while the other part of the adhesive material 109 is affixed the rear area 37 of the cover 13. The rear area 37 of the cover 13 includes a rear lower section 111 with pockets 113 in which are located weights 115 to hold the rear area 37 down. The weights 115 preferably are also magnets, so that if the structure is metallic, such as would be likely with a pick-up truck, the pull of the magnet also secures the rear area 37 of the cover 11 in place. However, by lifting against the force of the magnetic weights 115, the cover 13 in the rear area 37 can be lifted up and pulled free of the adhesive material 109 and then be put back over the roof area 31 so that the rear of the cap is open for ingress and egress to the inside of the cap.

While a preferred embodiment has been shown and described, various modifications and substitutions may be made without departing from the spirit and scope of this invention. Accordingly, it is understood that this invention has been described by way of illustration rather than limitation.

I claim:

1. A lightweight, readily assembled and disassembled cap for covering an open structure such as the box of a pickup truck, said cap comprising:

a front bow having generally inverted U-shape, said front bow having an upper portion which slopes outwardly and downwardly from its centerpoint at a small acute angle from the horizontal and side portions each of which slope outwardly and downwardly at an acute angle to the vertical with lower ends;

a rear bow having a generally inverted U-shape, said rear bow having an upper portion which slopes outwardly and downwardly from its centerpoint at small acute angle from the horizontal and side portions each of which slope outwardly and downwardly at an acute angle to the vertical with a pair of lower ends;

support means adapted to secure to the lower ends of both the front bow and the rear bow;

means for securing the support means to the open structure;

upper struts, each with two outside ends and with a U-shaped clip located on each of the two outside ends and being adapted firmly to press fit on the front bow and the rear bow;

lower struts with a U-shaped clip on each end secured to the front bow and to the rear bow adjacent the support means;

a front cross strut with two outside ends and with U-shaped clips at each of the outside ends secured to the lower ends of the front bow adjacent the support means;

a rear door frame having a generally inverted U-shape with an outside edge along the rear bow and having loops along the outside edge, said loops being adapted to fit about the rear; bow and a cover means with two opposite lower edge sections, a front edge section and a rear edge section, the two opposite lower edge sections being secured to the two lower struts and the front edge section being secured to the front cross strut.

2. A lightweight, readily assembled and disassembled cap for covering an open structure according to claim 1 wherein said support means includes a flat plate with a post extending substantially at right angles from the flat plate.

3. A lightweight, readily assembled and disassembled cap covering an open structure, according to claim 1, further including longitudinal webs, each longitudinal web including a loop at each end, one of said loops being around the front bow and the other of said loops being around the rear bow.

4. A lightweight, readily assembled and disassembled structure, according to claim 1, further including cross webs, each cross web including a loop at each end, one of said loops being around one upper strut and the other loop being around another upper strut.

5. A lightweight, readily assembled and disassembled cap for covering an open structure, according to claim 1, wherein there are at least three upper struts, one being connected between the centerpoint of the upper portion of the front bow and the centerpoint of the upper portion of the rear bow support and the other two of the three upper struts being connected between the opposite ends of the upper portions adjacent the side portions of the front bow and the rear bow.

6. A lightweight, readily assembled and disassembled cap for covering an open structure, according to claim 1, including a rear door frame having a generally inverted U-shape with an outside edge along the rear bow and having loops along the outside edge, said loops being adapted to fit about the rear bow and having a reusable adhesive means mounted on the rear door frame for retaining the cover means about the rear door frame.

7. A lightweight, readily assembled and disassembled cap for covering an open structure, according to claim 1, wherein there are at least three upper struts, one being connected between the centerpoint of the upper portion of the front bow and the centerpoint of the upper portion of the rear bow support and the other two of the three upper struts being connected between the opposite ends of the upper portions adjacent the side portions of the front bow and the rear bow, and further including cross webs, each cross web including a loop at each end, one of said loops being around one upper strut adjacent the side portions and the other of said loops being around the other upper strut adjacent the side portions, the cross webs being above the upper strut connected between the centerpoints.

8. A lightweight, readily assembled and disassembled cap for covering an open structure, according to claim 1, wherein the cover means includes:

a roof area, two side areas, one front area and one rear area, the roof area including two sections each sloping downwardly and outwardly from one another at an acute angle to the horizontal, the two side areas being contiguous with the two sections of the roof area with each side area sloping downwardly and outwardly at an acute angle to the vertical, the front area and the rear area being located at opposite ends of the roof area and the two side areas, said roof area, said two side areas and said front area being formed together in one contiguous member said rear area being connected to said roof area.

9. A lightweight, readily assembled and disassembled cap for covering an open structure, according to claim 1, wherein said front bow, said rear bow, said upper struts, said lower struts and said front cross strut are formed from two sections of telescoping hollow tubing.

10. A lightweight, readily assembled and disassembled cap for covering an open structure such as the box of a pick up truck, said cap comprising:
   a frame means including tubular members, said tubular members including struts with clip means on both ends for connecting the struts to the other tubular members, each of the tubular members being formed from two generally symmetrical halves telescopically fitted together;
   means for securing the frame to the open structure;
   a cover means adapted securely to fit over the frame means and having a roof area, two side areas, one front area and one rear area;
   a front bow having a generally inverted U-shape, said front bow having an upper portion which slopes outwardly and downwardly from its centerpoint at a small acute angle from the horizontal and side portions each of which slope outwardly and downwardly at an acute angle to the vertical with lower ends;
   a rear bow having generally inverted U-shape, said rear bow having an upper portion which slopes outwardly and downwardly from its centerpoint at a small acute angle to the vertical with lower ends; and
   a rear door frame having a generally inverted U-shape with an outside edge along the rear bow and having loops along the outside edge, said loops being adapted to fit about the rear bow.

11. A lightweight, readily assembled and disassembled cap for covering an open structure, according to claim 10, wherein said roof area includes two sections each sloping downwardly and outwardly from one another at an acute angle to the horizontal, the two areas being contiguous with the two sections of the roof area with each side area sloping downwardly and outwardly at an acute angle to the vertical, the front area and the rear area being located at opposite ends of the roof area and the two side areas, said roof area, said two side areas and said front area being formed together in one contiguous member said rear area being contiguous with said roof area.

12. A lightweight, readily assembled and disassembled cap for covering an open structure, according to claim 10, wherein said frame means includes:
   a front bow having generally inverted U-shape and having an upper portion which slopes downwardly and outwardly from its centerpoint at a small acute angle from the horizontal and side portions each of which slope downwardly and outwardly at an acute angle to the vertical;
   a rear bow a generally inverted U-shape and having an upper portion which slopes downwardly and outwardly from its centerpoint at small acute angle from the horizontal and side portions each of which slope downwardly and outwardly at an acute angle to the vertical.

13. A lightweight, readily assembled and disassembled cap for covering an open structure, according to claim 10, wherein said frame means includes:
   a front bow having generally inverted U-shape and having an upper portion which slopes downwardly and outwardly from its centerpoint at a small acute angle from the horizontal and side portions each of which slope downwardly and outwardly at an acute angle to the vertical to lower ends;
   a rear bow having a generally inverted U-shape and having an upper portion which slopes downwardly and outwardly from its centerpoint at small acute angle from the horizontal and side portions each of which slope downwardly and outwardly at an acute angle to the vertical to lower ends;
   at least three upper struts, each of the upper struts being connected by said clip means to the upper portions of the front bow and the rear bow;
   two lower struts, each of the two lower struts being secured by said clip means to lower ends of the front bow and to the lower ends of the rear bow; and
   a front cross strut being secured by said clip means to the lower ends of the frton bow support.

14. A lightweight, readily assembled and disassembled cap for covering an open structure, according to claim 10, wherein said means for securing the frame to the open structure includes a flat plate with a post extending substantially at right angles from the flat plate.

15. A lightweight, readily assembled and disassembled cap for covering an open structure, according to claim 10, including:
   a front bow having a generally inverted U-shape;
   a rear bow having a generally inverted U-shape; and
   longitudinal webs, each longitudinal web including a loop at each end, one of said loops being around the front bow and the other of said loops being around the rear loops.

16. A lightweight, readily assembled and disassembled cap for covering an open structure, according to claim 10, including:
   a front bow having a generally inverted U-shape;
   a rear bow having a generally inverted U-shape;
   upper struts, each with two outside ends and with a U-shaped clip located on each of the two outside ends and being adapted firmly to press fit on the front bow and the rear bow; and
   cross webs, each cross web including a loop at each end, one of said loops being around one upper strut and the other loop being around another upper strut.

17. A lightweight, readily assembled and disassembled cap for covering an open structure such as the box of a pick-up truck, said cap comprising:
   a front bow having generally inverted U-shape and being formed from tubing in two generally symmetrical halves telescopically fitted together, said front bow having an upper portion which slopes outwardly and downwardly at an acute angle to the vertical to form a pair of lower ends;
   a rear bow having a generally inverted support having a generally inverted U-shape and being formed from tubing in two generally symmetrical halves telescopically fitted together, said rear bow having an upper portion which slopes outwardly and downwardly from its centerpoint at small acute angle from the horizontal and side portions each of which slope outwardly and downwardly at an acute angle to the vertical to form a pair of lower ends;

four support members, each including a flat plate with a post extending substantially at right angles from the flat plate, the posts being adapted to slidably engage the lower ends of front bow and the lower ends of the rear bow;

four foam-like cushions affixed to the flat plate of each of the four support members on the opposite side from the post;

means for securing the support members to the open structure, the foam-like cushions being pressed against the open structure by the means for securing the support members;

a rear door frame having an outside edge and an inside edge and a generally inverted U-shape with the outside edge located along the rear bow and being generally formed in two symmetrical halves, each half having loops along the outside edge, said loops being adapted to fit about the rear bow;

an elongated U-shaped channel, said U-shaped channel being adapted to clip along the inside edge of the rear bow at the junction point of the two symmetrical halves to secure the two symmetrical halves together;

at least three upper struts, each including two telescopically engaging pieces of tubing with two outside ends and with a U-shaped clip on each of both outside ends, one of said three upper struts being connected between at the centerpoint of the upper portion of the front bow and the rear bow and the other two of the three upper struts being connected at opposite ends of the upper portion of the front bow and the rear bow adjacent the side portions of the front bow and the rear bow, all three of said upper struts being adapted firmly to press fit on the front bow support and the rear bow support;

four longitudinal webs, each including a loop at each end, one of said loops of each of the four webs being around the front bow and the other of said loops of each of the four webs being around the rear bow, two of said four longitudinal webs being between one outside upper strut and the center upper strut and the other two said longitudinal webbing members being between the other outside upper strut and the center upper strut;

four cross webs, each including a loop at each end, one of said loops of each of the four cross webs being around one of said outside upper struts and the other of said loops of each of the four cross webs being around the other one of said outside upper struts;

two lower support struts having two outside ends with a U-shaped clip on each outside end and formed from two telescopically engaging sections, each of the two lower support struts being substantially parallel to one another and each being secured by the U-shaped clips on both ends to the front bow and to the rear bow support adjacent the four support members;

a bowed roof strut with two outside ends and having a U-shaped clip on each of the two outside ends and being formed from two telescopically engaging sections, each of the two U-shaped clips being secured to opposite outside upper struts, said bowed roof strut being located generally midway between said front bow and said rear bow, said center upper strut and said four longitudinal webs being on top of said bowed roof strut;

a front cross strut with two outside ends and with U-shaped clips at each end and including two telescopically engaging sections and secured by the U-shaped clips to the front bow adjacent two of the four support members;

a cover with two longitudinal lower edge sections, one front edge section and a rear edge section, the lower struts being secured to the two longitudinal lower edge sections and the front cross strut being secured to the front edge section, adhesive means for securing said cover to the rear door frame and means within the rear lower edge section for securing the rear lower edge section to the open structure.

* * * * *